Jan. 4, 1927. 1,613,422
R. L. WEGEL
TRANSMISSION CONTROL
Filed July 9, 1921
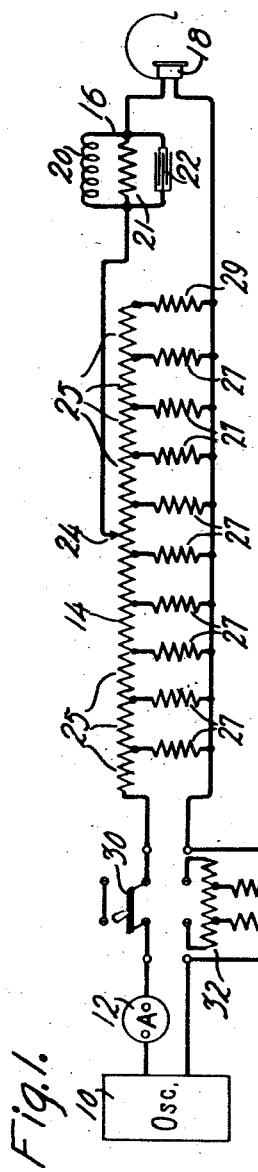
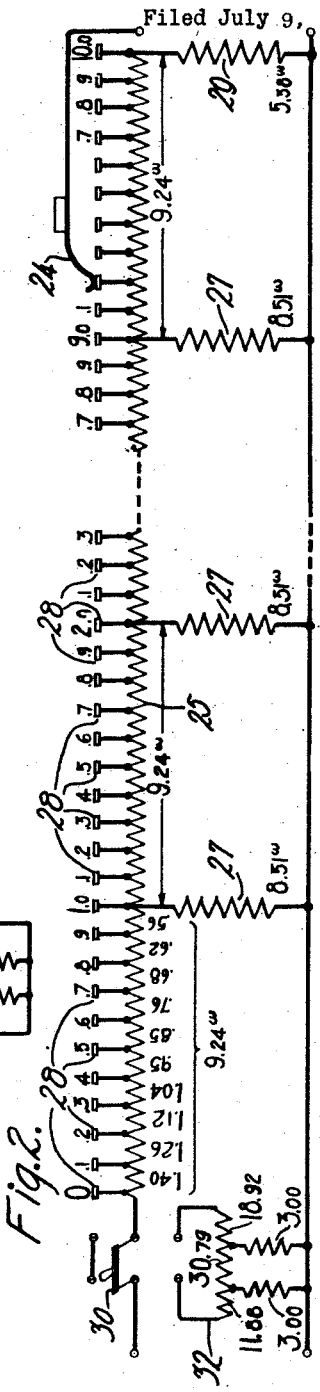
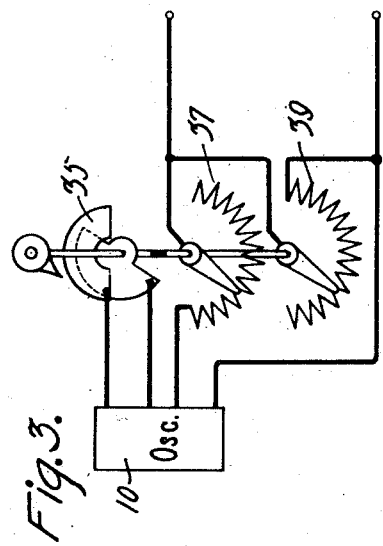
Inventor:
Raymond L. Wegel.
by W. E. Beatty, Att'y.

Patented Jan. 4, 1927.

1,613,422

UNITED STATES PATENT OFFICE.

RAYMOND L. WEGEL, OF NEW YORK, N. Y., ASSIGNOR TO WESTERN ELECTRIC COMPANY, INCORPORATED, OF NEW YORK, N. Y., A CORPORATION OF NEW YORK.

TRANSMISSION CONTROL.

Application filed July 9, 1921. Serial No. 483,533.

This invention relates to electric wave transmission, and more particularly to controlling and indicating relatively or absolutely the quantity of transmission through a system.

In testing the hearing, more especially that of deaf persons, it is frequently desirable to measure the sensitivity of the ear at a plurality of frequencies within the voice range. An apparatus for determining minimum audibility at a plurality of frequencies was described by Wien in Archiv fur Physiologie, vol. 97, pages 6 to 16, 1903. This apparatus was somewhat crude, and difficulty was experienced in obtaining measurements anywhere near approaching accuracy. In accordance with this invention an apparatus for ear analysis is provided employing a vacuum tube oscillator as a dependable source of waves of different frequencies, a high quality receiver for converting electrical energy into sound waves, and a specially constructed potential attenuator or potential variometer for accurately controlling the amount of energy which reaches the receiver and varying it through wide ranges.

In particular it is an object of the invention to provide an attenuator which may have its adjustable side connected to a device such as a telephone receiver having a finite impedance. Receivers employed for the purposes of this invention may have an impedance, for example, of the order of 200 ohms. If the attenuator is to function properly as an attenuator of potential, its maximum resistance must be low in comparison to the impedance of the receiver, preferably not more than one tenth the value. The type of potential variometer heretofore used, namely, a "slide wire" or its equivalent would be impracticable of manufacture with the very large range of attenuation required particularly in ear tests because the successive resistances for making the steps, particularly near the low end of the potentiometer, would be of such small values that they could not be manufactured with sufficient accuracy for precision work. This difficulty is avoided by using an attenuator in the form of an artificial line having a plurality of sections of series and shunt resistances, taps being taken from the series resistances for engagement with the adjustable contact connected to one side of the receiver.

The above and other objects of the invention will be clearly understood from the following detailed description and claims taken in connection with the accompanying drawings, in which Fig. 1 represents diagrammatically a system embodying the invention, Fig. 2 is a detail view of the attenuator and Fig. 3 represents a method of controlling the current at different frequencies.

Referring to the drawings by reference numerals, the vacuum tube oscillator 10 is connected through an ammeter 12, a potential attenuator 14, and an equalizing network 16 to a receiver 18. As will be noted below, the equalizing network 16 is not always necessary. It may be employed where a receiver is undamped or partially damped but has a resonant point which may be equalized by the network shown, or by other equivalent networks, such, for example, as those shown in the patent to E. C. Wente, No. 1,478,078, dated December 18, 1923. The network shown herein comprises an inductance 20, a resistance 21, and a condenser 22 in parallel.

The attenuator 14 comprises a plurality of series resistances 25, which are preferably equal, a plurality of shunt resistances 27, also preferably equal, and a terminating resistance 29, which usually is of a different value than resistances 27. As indicated in Fig. 2, ten taps 28 may be taken from each series resistance 25, each tap representing a change in attenuation of .1 "attenuation unit" or "napier". Since attenuation is the real part of the propagation constant of a line, "attenuation unit" has a definition corresponding to the definition of "propagation constant" which is given by the American Institute of Electrical Engineers as follows:

"The natural logarithm of the vector ratio of the steady state currents at various points separated by a unit length in a uniform line of infinite length or at successive corresponding points in a line of recurrent structure of infinite length."

This holds true, of course, in a line having a finite number of recurrent sections which is terminated in its own characteristic impedance. Since we are dealing with pure resistances, the imaginary part of the propagation constant does not need to be considered. Letting $A$ represent attenuation in napiers, $I_2$ current entering a section, and $I_1$ current leaving a section, then by the above definition, $$A = \log_e \left| \frac{I_2}{I_1} \right|, \quad (1)$$

where $\left| \frac{I_2}{I_1} \right|$ represents the real part of $\frac{I_2}{I_1}$. Where a network comprises a plurality of sections having equal series and shunt impedances $Z_1$ and $Z_2$, it is shown in Campbell Patent No. 1,227,113 that $$A = \cosh^{-1}\left[ \frac{1}{2}\left(\frac{Z_1}{Z_2}\right) + 1 \right] \quad (2)$$

If we let $Z_{fse}$ represent the full series impedance of the network, measured across the first or any subsequent section, and $Z_{fsh}$ the full shunt impedance, the impedance formulæ are as follows:

$$Z_{fse} = \frac{Z_1}{2}\left(1 + \sqrt{1 + \frac{4Z_1^2}{Z_2^2}}\right) \quad (3),$$

and $$Z_{fsh} = Z_{fse} - Z_1$$

In the present case $Z_1$ represents a resistance 25, $Z_2$ a resistance 27, and $Z_{fsh}$ a resistance 29. It is evident that when the required attenuation per section and a characteristic impedance $Z_{fse}$ or $Z_{fsh}$ is specified, the impedances $Z_1$ and $Z_2$ are determined from the above formulæ. In order that smaller steps of potential may be taken than those corresponding to the attenuation of full sections, points are tapped off at the proper places along the series arms according to a logarithmic scale. This makes the potential of the contact points a uniform logarithmic function of their distance from the input terminal regardless of their positions with respect to the shunt resistances. In this illustrative case each section has an attenuation of unity or one napier according to the definition given above and points are interpolated on the series arms in such a way as to give tenths of napiers. The sections can be made so as to give a decrease in potential of a factor of ten each, i. e. using the common logarithms with 10 as a base or any other base and any number of contact points distributed on the series arm so as to give a decrease in potential continuous with that of the points at the shunt arms.

If it is so desired, the variation of potential from contact to contact can be fixed to vary according to any decreasing function other than logarithmic as well to suit any particular purpose, by the proper application of the above theory.

In order that the attenuator may be calibrated in tenths of napiers, each section representing an attenuation of 1 napier, and have a maximum impedance in shunt to the receiver of $Z_{fse} = 14.62$ ohms, it was found that the individual resistances should have the values indicated in Fig. 2. With the attenuator constructed as shown and described, a total attenuation of 10 napiers is obtained. It is sometimes desired to introduce additional attenuation in large steps. In such case a switch 30 may be thrown to connect into the line an artificial line 32, so constructed as to introduce an additional attenuation of 5 napiers. For this value the separate resistances of artificial line 32 should have the values indicated in Fig. 2. It will be noted that resistances 25 in the example each have a value of 9.24 ohms, the individual resistances forming the interpolated steps all having values at least greater than ½ ohm, although it is obvious that the current change produced by moving the contact 24 from one tap to another in the last section is very much smaller than a similar step in the first section. With the total attenuation of 15 napiers introduced in the circuit, the ratio of potential across the input terminals of the attenuator to that at the end of the network is approximately 3,270,000 : 1.

In constructing attenuator 14, it is important that resistance units and other parts be placed at considerable distances from other parts having relatively greatly differing potentials in order to avoid capacity effects. If care is exercised in this respect, contacts 28 may be arranged circularly for use with a dial switch.

In case an oscillator is employed which does not produce a constant value of current at all frequencies, the ammeter 12 may be inserted and calibrated in terms of napiers below an arbitrary value of current taken as a standard. The total attenuation of the system will then be the sum of the readings of the potentiometer 14 and the ammeter 12. Another method of correcting for unequal currents at different frequencies is shown in Fig. 3. A variable condenser 35 for controlling the frequency of the oscillator is mechanically connected to series and shunt resistances 37 and 39, which may be so arranged as to produce a constant voltage at all frequencies, or may be so arranged as to take care of this variation in the oscillator and also any variation in the response of the receiver 18 so that constant sound energy may be produced at all frequencies. With this method the equalizer 16 may be omitted. The equalizing network may also be omitted if a receiver is employed which is sufficiently damped to give a substantially constant response at all frequencies within the range desired to be transmitted. The last mentioned arrangement is of course to be preferred where such receivers are available.

The method of use of the invention is believed to be evident from the above description. For example, if it be desired to take a curve of minimum or threshhold audibility of one or both ears of a patient, the system may be constructed or preliminarily adjusted to produce a tone of maximum energy which may be taken as a standard for comparison. The ear is tested at separate frequencies covering the range desired, say at any desired intervals of frequency from 16 cycles to 40,000 cycles. Preferably the potentiometer indicator is first moved toward the low end of the scale until the patient can no longer hear the note, and then it is moved toward the high end until the note is again audible. If the two readings do not coincide, their mean is taken as the correct reading.

It will be noted that each of the above described modifications provides a completely calibrated system by means of which the attenuation can be read directly from one or more scales, no complex calculations being necessary, as in previous arrangements, such as that of Wien above referred to.

It is usually desired to know only the relative amounts of energy at different frequencies. It is obvious, however, that, if desired, the calibrations could be made in terms of the absolute value of energy emitted by the receiver.

While certain forms of apparatus for carrying out the invention have been described herein, it is to be undertsood that the invention is not limited to the forms described, but is entitled to the use of equivalents within the spirit of the appended claims.

While it has been found that a scale of attenuation based on the expression $$A = \log_e \left(\frac{I_2}{I_1}\right)$$

is much more suitable for ear analysis than an arithmetical scale, it may sometimes be desirable to use some other geometrical scale, such as logarithms to the base 10 or to the base 2.

It further may be desirable to design the set so that the readings, instead of being based on a fixed tone amplitude, may indicate percentage of normal hearing. If it is desired to omit any of the corrective devices above mentioned, a chart may be employed for making corrections. A chart may also be employed for converting readings of attenuation into percentage of normal hearing.

What is claimed is:

1. A potential attenuator comprising a resistance path adapted to be connected across a source of voltage, a second resistance path connected in parallel with a portion of the first mentioned path, and a contact adapted to make adjustable connection along said first mentioned path on either side of one connection of said second resistance path to said first mentioned path.

2. A potential attenuator comprising a resistance path adapted to be connected across a source of voltage, a second resistance path connected in parallel with a portion of the first mentioned path at its low potential end, and a contact adapted to make adjustable connection along said first mentioned path on either side of one connection of said second resistance path to said first mentioned path.

3. A potential attenuator comprising a resistance path adapted to be connected across a source of voltage, and a plurality of resistance paths connected in parallel respectively with successively increasing portions of the first mentioned path, and unitary switching means adapted to make adjustable connection along said first mentioned path on either side of points of connection of said resistance paths to said first mentioned path.

4. A potential attenuator comprising a resistance path adapted to be connected across a source of voltage, a plurality of resistance paths having a common terminal at a point on said first path and having their other terminals connected at spaced points on the first mentioned path, and unitary switching means adapted to make adjustable connection along said first mentioned path on either side of said other terminals of said resistance paths.

5. A potential attenuator comprising a resistance path adapted to be connected across a source of voltage, a plurality of resistance paths having a common terminal at the low potential end of the first mentioned path and having their other terminals fixed at spaced points on the first mentioned path, and unitary switching means adapted to make adjustable connection along said first mentioned path on either side of said other terminals of said resistance paths.

6. A potential attenuator comprising a resistance path adapted to be connected across a source of voltage, a plurality of resistance paths having a common terminal at the low potential end of said first path and having their other terminals connected at equal intervals on the first mentioned path, and unitary switching means adapted to make adjustable connection along said first mentioned path on either side of said other terminals of said resistance paths.

7. A potential attenuator comprising a resistance path adapted to be connected across a source of voltage, a plurality of equal resistance paths having a common terminal at the low potential end of the first mentioned path and having their other terminals connected at equal intervals on said first mentioned path, and unitary switching means adapted to make adjustable connection along said first mentioned path on either side of said other terminals of said equal resistance paths.

8. A potential attenuator comprising a multi-section artificial line of T-type section, having shunt and series impedance and unitary switching means for making an adjustable connection at points on the series impedances in each section of said line.

9. A potential attenuator comprising a multi-section artificial line having shunt and series resistances and unitary switching means for making an adjustable connection at points on the series resistances in each section of said line.

10. A potential attenuator comprising a multi-section artificial line of T-type section, having series and shunt impedances, and means comprising a single contact for making adjustable connections on said series impedances in successive steps reducing the potential according to a decreasing function.

11. A potential attenuator comprising a multi-section artificial line having series and shunt resistances, and means comprising a single contact for making adjustable connections on said series impedances in successive steps reducing the potential according to a logarithmic function.

12. A multi-section artificial line of T-type section, comprising series and shunt impedances, and unitary switching means for varying the number of sections in said line, and for varying within each section of said line the series impedance independently of the shunt impedance.

In witness whereof, I hereunto subscribe my name this 6th day of July A. D., 1921.

RAYMOND L. WEGEL.